(12) United States Patent
Otobe et al.

(10) Patent No.: US 7,357,984 B2
(45) Date of Patent: Apr. 15, 2008

(54) POLYMER-COATED CARBON NANOTUBE

(75) Inventors: Kazunori Otobe, Tsukuba (JP); Hidenobu Nakao, Tsukuba (JP); Hideki Hayashi, Nagoya (JP); Fumiyuki Nihey, Tokyo (JP)

(73) Assignees: Incorporated Administrative Agency National Agriculture and Bio-Oriented Research Organization, Tsukuba-Shi (JP); NEC Corporation, Tokyo (JP)

( * ) Notice: Subject to any disclaimer, the term of this patent is extended or adjusted under 35 U.S.C. 154(b) by 245 days.

(21) Appl. No.: 10/515,297

(22) PCT Filed: May 13, 2003

(86) PCT No.: PCT/JP03/05922

§ 371 (c)(1),
(2), (4) Date: May 2, 2005

(87) PCT Pub. No.: WO03/101891

PCT Pub. Date: Dec. 11, 2003

(65) Prior Publication Data

US 2006/0057053 A1 Mar. 16, 2006

(30) Foreign Application Priority Data

Jun. 3, 2002 (JP) ............................. 2002-160931

(51) Int. Cl.
*D01F 9/12* (2006.01)

(52) U.S. Cl. ....................... 428/368; 428/357; 428/364; 428/375; 428/397; 428/398; 428/401; 977/734; 977/742; 977/745; 977/748; 977/753

(58) Field of Classification Search ................ 977/742, 977/745, 746, 750, 752, 734, 748, 753; 428/357, 428/364, 368, 375, 397, 398, 401
See application file for complete search history.

(56) References Cited

OTHER PUBLICATIONS

McCarthy et al., "Microscopy studies of nanotube-conjugated polymer interactions", Synthetic Metals 121 (2001), 1225-1226.*
B.Mc Carthy et al., "Microscopy studies of nanotube-conjugated polymer interactions" Synthetic Metals, 2001, vol. 121, pp. 1225-1226.
M. Yudasaka et al., "Effect of an organic polymer in purification and cutting of single-wall carbon nanotubes," Appl. Phys. A, 2000, vol. 71, pp. 449-451.
Mei Gao et al., "Aligned coaxial nanowires of carbon nanotubes sheathed with conducting polymers," Angew. Chem. Int. Ed., 2000, vol. 39, No. 20, pp. 3664-3667.
Kazunori Otobe et al., "Fluorescence visualization of carbon nanotubes by modification with silicon-based polymer," Nano Letters, 2002, vol. 2, No. 10, pp. 1157-1160.
Jason E. Riggs et al. "Strong luminescence of solubilized carbon nanotubes," J. Am. Chem.Soc., 2000, vol. 122, pp. 5879-5880.
Alexander Star et al., "Preparation and properties of polymer-wrapped single-walled carbon nanotubes," Angew.Chem.Int.Ed, 2001, vol. 40, No. 9, pp. 1721-1725.
M. Yudasaka et al., "Purification and cutting of single-walled carbon nanotubes enabled by polymer adsorption," Dai 20 Kai Fullerene Sogo Symposium Koen Yoshishu, 2001, p. 105.
Yi Lin et al., "Functionalizing multiple-walled carbon nanotubes with aminopolymers," J.Phys.Chem. B., 2002, vol. 106, pp. 1294-1298.

* cited by examiner

*Primary Examiner*—Terrel Morris
*Assistant Examiner*—Matthew D Matzek
(74) *Attorney, Agent, or Firm*—Birch, Stewart, Kolasch & Birch, LLP

(57) ABSTRACT

By coating the outer surface of carbon nanotubes with various polymers of different properties, such properties as insulation property, reactivity, optical visibility, solvent dispersion property and so on are given to the outer surface of the carbon nanotubes.

7 Claims, 5 Drawing Sheets

Before coating

After coating

POLYMER-COATED CARBON NANOTUBE

The present application claims priority on Japanese Patent Application No. 2002-160931 filed on Jun. 3, 2002. The entire contents of this application are hereby incorporated by reference.

TECHNICAL FIELD

The present invention relates to a carbon nanotube whose outer surface is coated with a polymer. Since such a carbon nanotube can be made optically visible, modified with biologically active substances and improved in its physical properties, application of such a nanotube to extremely fine biosensors, fine processing apparatuses for cells, gene transfer, three-dimensional electronic circuits and so on is expected.

BACKGROUND ART

Carbon nanotubes are tube-like molecules 1 nm to several ten nm in diameter and 0.1 to several μm in length, which are classified into the mono-layer type and the multi-layer type depending on the number of layers of the walls constituting their hollow structures. These molecules are expected as promising mechanical/electronic materials because they are extremely thin and long, high in mechanical strength, excellent in electrical properties, and high in structure stability. At present, they are mainly used as materials for engineering purposes, and are now being put into practical use as highly efficient electron radiation sources and probes for atomic force microscopes. Although still in the research stage, application of carbon nanotubes to such as microactuators or gas sensors is now being studied. On the other hand, in the field of biochemistry, their application to probes for gene transfer or micromanipulators is being studied. However, in any of their usages, electron microscopes are generally used for mechanical handling of carbon nanotubes because of difficulty in their optical recognition since their diameters are below the limit of optical resolution. Further, methods of modification of carbon nanotubes currently known are, for example, a method in which the carboxyl group generated at the site of cleavage of the structure is used; a method using high temperature fluorine; and a method in which defects are generated by sonication in polymethyl methacrylate.

Carbon nanotubes have such properties that they are extremely thin, excellent in structure stability, high in mechanical strength, and good in electrical properties. However, on the other hand, their properties give rise to the following problems: it is difficult to optically recognize them because their diameters are below the limit of optical resolution; it is difficult to process them because they are high in mechanical strength; it is difficult to introduce into them groups to be reacted with biologically active substances because they are high in structure stability; and it is necessary to insulate them when they are used as signal cables. In particular, in the application of them to organisms where operations under microscopic observation are indispensable, their poor optical recognition property is a big drawback.

It is an object of the present invention to solve the above-described problems of the relevant technology and to provide novel carbon nanotubes which have overcome the conventional drawbacks.

DISCLOSURE OF THE INVENTION

As a result of extensive and intensive researches toward the solution of the above-described problems, the present inventors have found that, by dissolving a polymer which is expected to have affinity for a carbon nanotube in a solvent and then adding the carbon nanotube to the solvent, the polymer is adsorbed onto the carbon nanotube to thereby reduce the optical absorption in the solution. The inventors have assumed that this adsorption is attributable to the coating of the outer surface of the carbon nanotube with the polymer. Further, the inventors have elucidated the state of coating of the carbon nanotube outer surface with a polymer using optical microscopes and electron microscopes. As a result, the inventors confirmed that is it possible to completely coat a carbon nanotube with a polymer. Further, since polymers are excellent in insulation, fluorescence property, easy introduction of various reaction groups, and crosslinking/polymerizing reactivity, possibilities of improving the physicochemical properties of carbon nanotubes and adding thereto optical visibility by utilizing the above properties of polymers have been found. Thus, the present invention has been achieved.

The first aspect of the present invention relates to a carbon nanotube whose outer surface is coated with a polymer.

The second aspect of the invention relates to a method of preparing a polymer-coated carbon nanotube, comprising dissolving in a solvent a polymer having affinity for the outer surface of a carbon nanotube and then suspending the carbon nanotube in the solvent to thereby coat the outer surface of the carbon nanotube with the polymer.

The third aspect of the invention relates to a method of making a carbon nanotube optically visible, comprising coating the outer surface of the carbon nanotube with a polymer which emits fluorescence of the visible light wavelength range.

The fourth aspect of the invention relates to a method of preparing a material for three-dimensional electron wiring, comprising using a polymer-coated carbon nanotube.

The fifth aspect of the invention relates to a method of preparing a carbon nanotube with a high solvent dispersion property, comprising coating the outer surface of the carbon nanotube with a polymer.

Hereinbelow, the present invention will be described in more detail.

The carbon nanotube of the invention is a carbon nanotube whose outer surface is coated with a polymer. Although carbon nanotubes are readily aggregated in a solvent, their dispersion property is improved by coating them with a polymer. Besides, by using the polymers described later, it is possible to add specific properties to a carbon nanotube.

The carbon nanotube to be coated may be either a single-wall carbon nanotube or a multi-wall carbon nanotube.

The polymer used in the invention may be any polymer as long as it has affinity for carbon nanotubes. However, it is preferable to use polymers which have Si atom(s) or π conjugated bond(s) in the molecular structure. Among such polymers, it is preferable to use the polydibenzodisilaazepine represented by general formula (I) below.

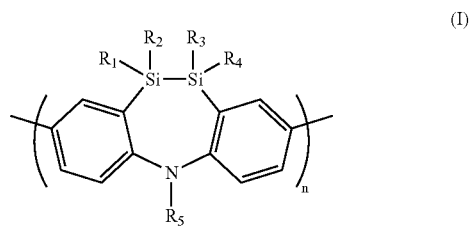

(wherein $R_1$ to $R_4$ independently represent an alkyl group, aryl group, alkoxy group or aryloxy group each of which may be substituted; $R_5$ represents a hydrogen atom or an alkyl group, aryl group, alkoxy group or aryloxy group each of which may be substituted; and n represents the degree of polymerization.)

Examples of the alkyl group in $R_1$ to $R_5$ in the above general formula (I) include straight-chained, branched or circular alkyl groups with 1-20 (preferably 1-10) carbon atoms, such as methyl, ethyl, n- or iso-propyl, n-, iso- or tert-butyl, n-, iso- or neo-pentyl, n-hexyl, cyclohexyl, n-heptyl and n-octyl. Examples of the alkoxy group include straight-chained, branched or circular alkoxy groups with 1-20 (preferably 1-10) carbon atoms, such as methoxy, ethoxy, n- or iso-propoxy, n-, iso- or tert-butoxy, n-, iso- or neo-pentoxy, n-hexoxy, cyclohexoxy, n-heptoxy and n-octoxy. Examples of the aryl group include aryl groups with 6-20 (preferably 6-14) carbon atoms, such as phenyl group, o-, m- or p-tolyl group, 1- and 2-naphtyl group, and anthryl group. Examples of the aryloxy group include aryloxy groups with 6-20 (preferably 6-14) carbon atoms, such as phenoxy group, o-, m- or p-tolyloxy group, 1- and 2-naphtoxy group, and anthryloxy group.

As the polymer, any of the following polymers (1) to (4) may also be used.

(1) Polymers which Emit Fluorescence of the Visible Light Wavelength Range

Examples of such polymers include, in addition to the polydibenzodisilaazepine described above, polythiophene, poly(N-vinylcarbazole) and poly(phenylene vinylene). Although carbon nanotubes have had the problem of difficulty in optical recognition, this problem can be solved by coating them with a polymer which emits fluorescence of the visible light wavelength range.

(2) Polymers which Have on their Surface an Exposed Reaction Group Having Affinity for Biologically Active Molecules Examples of such polymers include, in addition to the polydibenzodisilaazepine described above, polyaniline, poly(vinylpyridine) and poly(vinyl alcohol). Examples of exposed reaction groups having affinity for biologically active molecules include, but are not limited to, vinyl group, amine group, carboxyl group, aldehyde group and hydroxyl group. Although carbon nanotubes have had the problem of difficulty in introducing biologically active molecules because of their high structure stability, this problem can be solved by coating them with a polymer which has on its surface an exposed reaction group having affinity for biologically active molecules.

(3) Insulating Polymers

Examples of such polymers include, in addition to the polydibenzodisilaazepine described above, polyethylene, polystyrene and polyethylene terephthalate. Although it has been necessary to insulate a carbon nanotube when it was used as a signal cable, this problem can be solved by coating the carbon nanotube with an insulating polymer.

(4) Polymers which Have a Nature of Binding Firmly Through Crosslinking or Polymerization Examples of such polymers include, in addition to the polydibenzodisilaazepine described above, polyarylene ethylene, polydiacetylene and poly(vinylpyridine). By using a polymer which has a nature of binding firmly through crosslinking or polymerization for coating, it becomes possible to enhance the intensity of the coating material (polymer), which leads to the preparation of a carbon nanotube whose coating is not easily fallen off.

The carbon nanotube of the invention can be prepared, for example, by dissolving in a solvent a polymer which has affinity for the outer surface of a carbon nanotube and then suspending the carbon nanotube in the solvent to thereby coat the outer surface with the polymer.

The solvent used here may be any solvent as long as it is capable of dissolving the polymer. For example, when polydibenzodisilaazepine is used as a polymer, 1,2-dichloroethane, tetrahydrofuran or the like may be used.

It is preferred that the carbon nanotube suspended in the solvent be compulsively dispersed to improve the reaction with the polymer. It has been confirmed in experiments that carbon nanotubes are easily aggregated after dispersion. It has been also confirmed that the presence of a polymer improves the dispersion property of a carbon nanotube.

The amount of polymer to be dissolved for coating is not particularly limited. For example, when polydibenzodisilaazepine is dissolved in 1,2-dichloroethane, 0.1-20 mg/l is appropriate. The appropriate amount of carbon nanotube is 1 mg or less for 20 ml of the polymer solution.

The polymer-coated carbon nanotube may be taken out by dropping the mixed solution of the polymer and the carbon nanotube onto a silicon baseboard or slide glass and then drying. At this time, if the affinity of the polymer for the carbon nanotube is high, no particular problem will occur. If the affinity is low, it has been observed that the polymer layer adsorbed onto the carbon nanotube is thin when there is only one solvent that is dissolving the polymer. Besides, it has also been confirmed that microscopic observation of the polymer-coated carbon nanotube becomes impossible because a large quantity of dissolved polymer present in the background reduces the contrast of the nanotube. In order to solve this problem, a solvent that does not dissolve the polymer much, such as ethanol or dimethyl sulfoxide, may be used to increase the adsorption of the polymer onto the outer surface of the carbon nanotube. Alternatively, similar effect may be obtained by decreasing the temperature to thereby increase the aggregation property of the polymer and promote the aggregation thereof on the outer surface of the carbon nanotube.

BEST MODES FOR CARRYING OUT THE INVENTION

Figure 1:
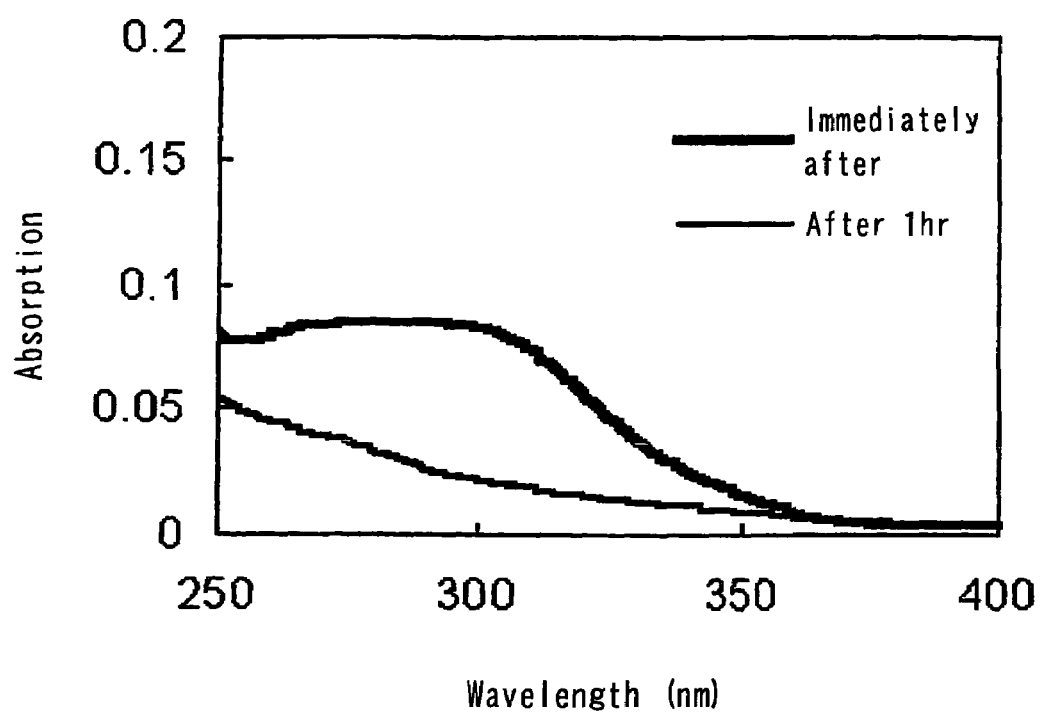
FIG. 1 is a graph showing the changes in absorbance after the addition of a carbon nanotube to a solvent dissolving a polymer.

Poly(5,10,10,11,11-pentamethyldibenzodisilaazepine-2,8-diyl) (general formula (I), where $R_1=R_2=R_3=R_4=R_5$=methyl) was dissolved in 1,2-dichloroethane to prepare a polymer solution (0.2 mg/l). Subsequently, to 5 ml of this solution, 0.01 mg of a multi-wall carbon nanotube prepared by the arc method was added. The mixture was agitated by sonication for 1 minute and then left stationary. Absorbance was measured immediately thereafter and 1 hour thereafter, followed by comparison of absorption spectra (FIG. 1). As shown in FIG. 1, in the wavelength range below 350 nm where absorption characteristic to polydibenzodisilaazepine exists, the characteristic absorption no longer exists after 1 hour. Therefore, it was reasoned that the polymer was adsorbed onto the carbon nanotube specifically. The multi-wall carbon nanotube used here usually has a diameter of approximately 100 nm and is arranged in bundles. With this thickness, it is barely possible to perform light field microscopic observation. Thus, such observation was used for the confirmation of the state of polymer coating.

Figure 2:
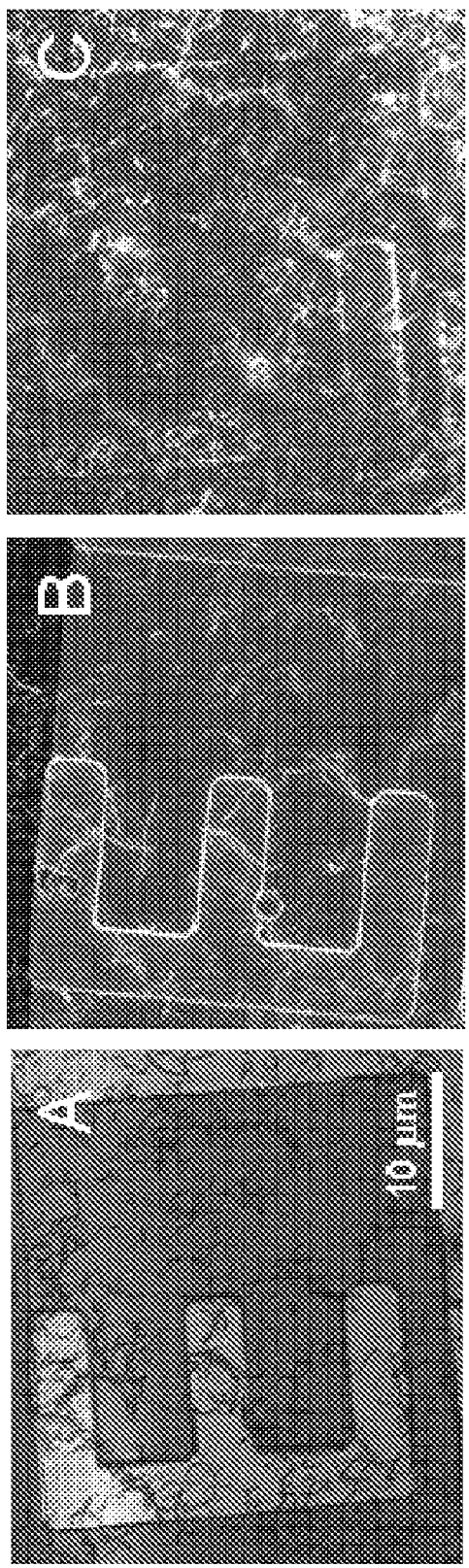
FIG. 2 presents photographs showing the results of fixed point observation of a polymer-coated carbon nanotube by different observation methods. A is a light field image; B is a scanning electron microscopic image; and C is a dark field image.
Figure 3A:
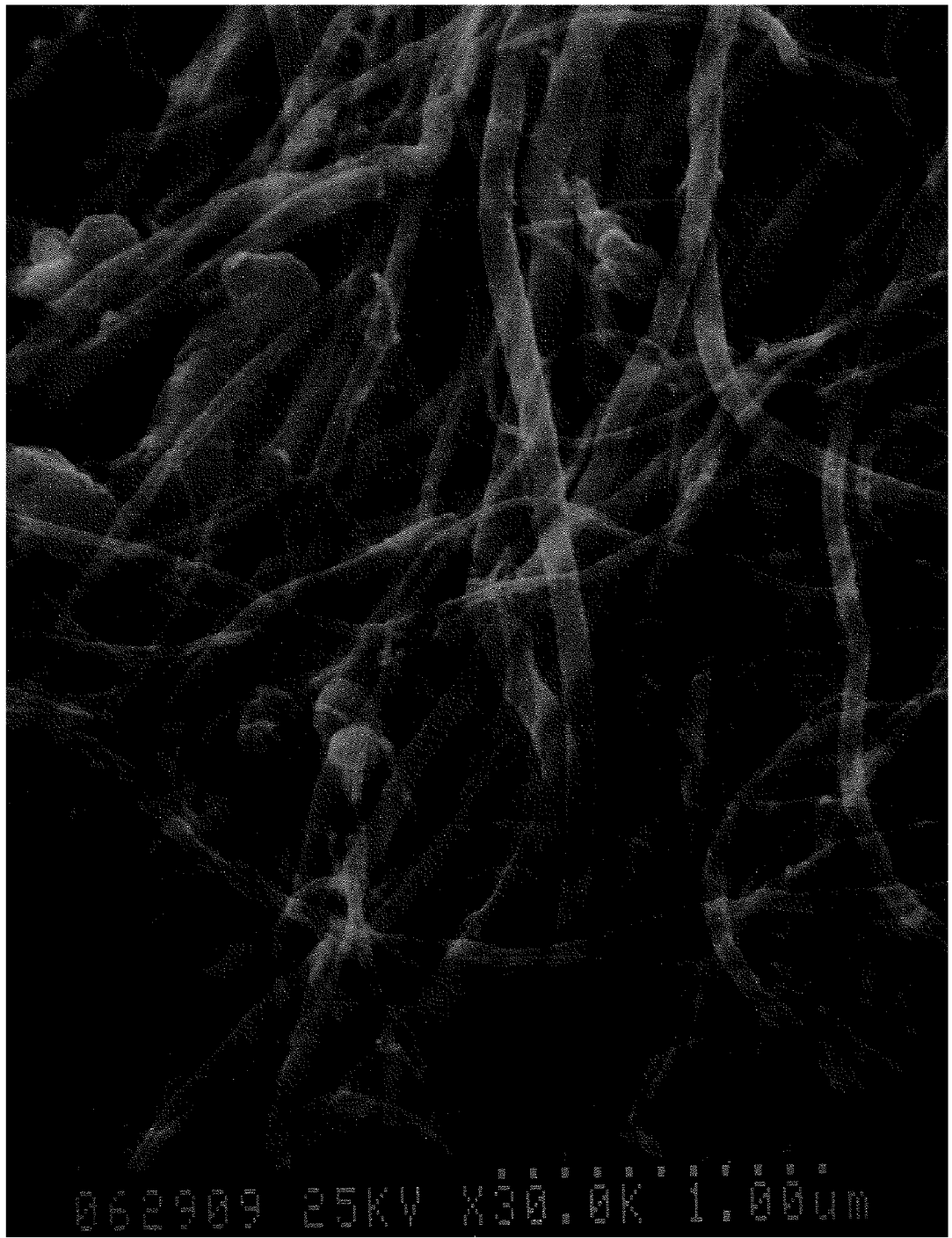
FIG. 3 presents photographs taken with a scanning electron microscope, showing the state of a carbon nanotube before and after coating with a polymer. a. shows the state before coating and b. shows the state after coating.
Figure 3B:
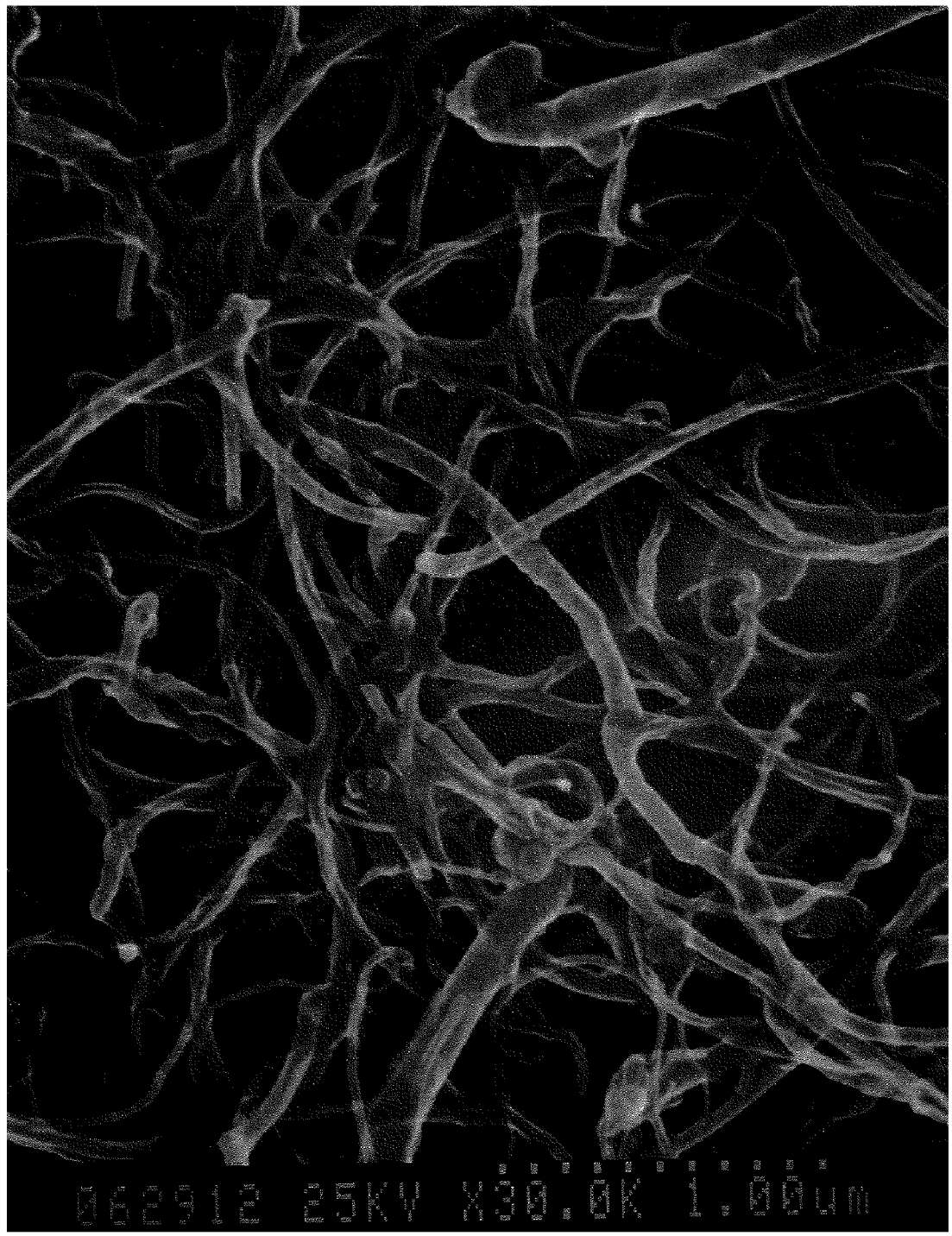

Based on the results obtained so far, the same site of the same sample was examined by dark field microscopic observation, light field microscopic observation, and scanning electron microscopic observation at 370-450 nm which is the wavelength of the fluorescence emitted by the polymer. Thus, the state of adsorption of the polymer onto the carbon nanotube was examined. The suspension of the polymer-coated carbon nanotube was dropped onto a silicon baseboard provided with checkerboard-like divisions on which numbers are carved by etching. Using the thus provided number, the same site of the board was examined by the above described three observation methods. As a result, a similar string-like or collective-state nanotube was recognized at the same site in each of the observation methods. Therefore, it was confirmed that the polymer was adsorbed onto the entire surface of the carbon nanotube (FIG. 2). Further, the results of high resolution observation with a scanning electron microscope revealed that the shape of the outer surface of the carbon nanotube was clearly different before and after the polymer coating; it was confirmed that a large amount of polymer was adsorbed onto the surface (FIG. 3).

Figure 4:
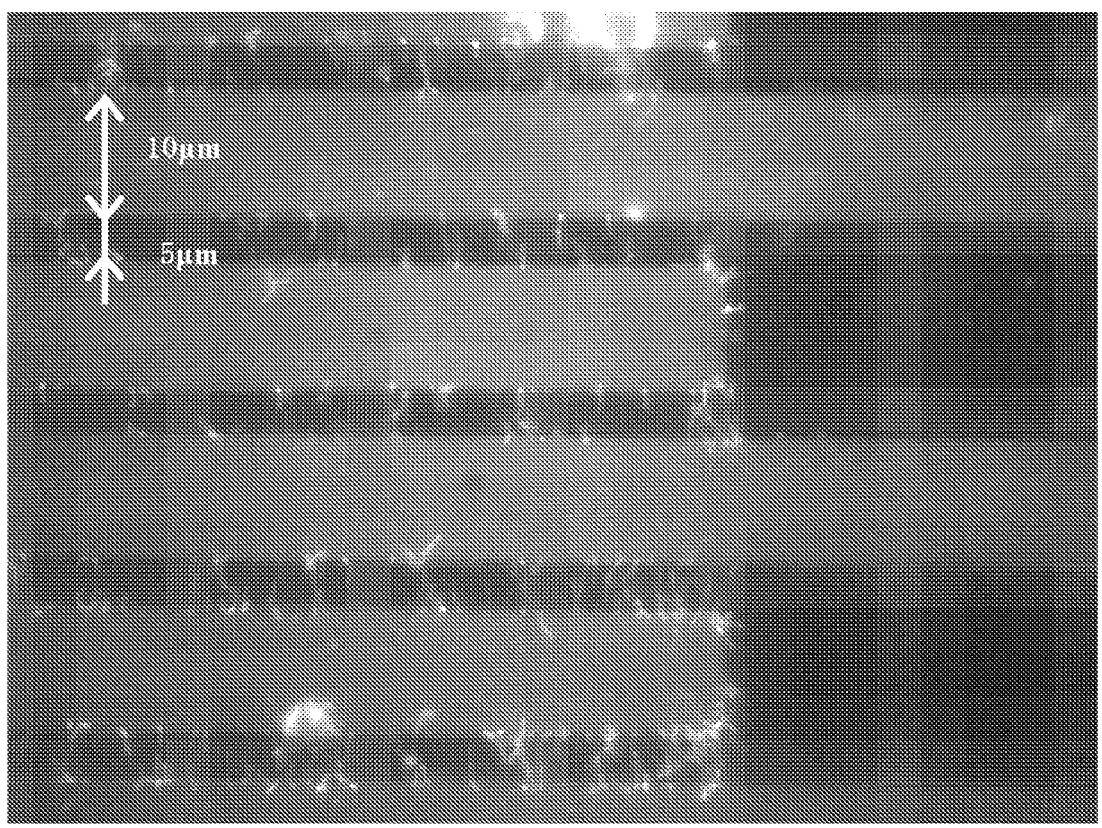
FIG. 4 is a photograph showing a comb-shaped electrode on which a polymer-coated carbon nanotube is oriented.

Subsequently, a single-wall carbon nanotube was coated with the polymer in the same manner as described above, followed by measurement of electric properties. It is known that carbon nanotubes show the nature of conductor or semi-conductor. Thus, it is possible to orient a carbon nanotube on electrodes in an AC electric field. Also, since the crossing of both positive and negative electrodes by a carbon nanotube causes conduction of electric current, the electric properties of the above polymer-coated carbon nanotube can be confirmed by examining the amount of the voltage decrease from the applied voltage. To a comb-shaped electrode 10 μm in electrode width and 5 μm in gap between electrodes, AC voltage of 9.0 Vp-p, 1 MHz was applied through a fixed resistance of 1 kΩ, and 100 μl of the suspension of polymer-coated carbon nanotube was dropped onto the electrode to thereby orient the carbon nanotube (FIG. 4). As a result of measurement of the voltage decrease, no decrease was recognized though a number of carbon nanotubes were crossing both positive and negative electrodes. Therefore, it was confirmed that the carbon nanotube was insulated by coating with the polymer.

The present specification encompasses the contents disclosed in the specification and/or drawings of the Japanese Patent Application No. 2002-160931 based on which the present application claims priority. All publications, patents and patent applications cited herein are incorporated herein by reference in their entity.

INDUSTRIAL APPLICABILITY

As described so far, by coating the outer surface of a carbon nanotube with a polymer, it becomes possible to give the outer surface of the carbon nanotube insulation property, reactivity, optical visibility and solvent dispersion property.

The invention claimed is:

1. A carbon nanotube whose outer surface is coated with a polymer having Si atom(s), wherein said polymer having Si atoms(s) in its molecular structure is polydibenzodisilaazepine represented by the general formula (I):

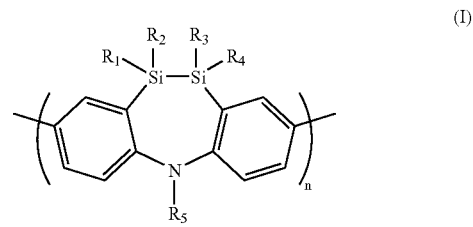

(wherein $R_1$ to $R_4$ independently represent an alkyl group, aryl group, alkoxy group or aryloxy group each of which may be substituted; $R_5$ represents a hydrogen atom or an alkyl group, aryl group, alkoxy group or aryloxy group each of which may be substituted; and n represents the degree of polymerization).

2. The carbon nanotube according to claim 1, wherein the polymer emits fluorescence of the visible light wavelength range.

3. The carbon nanotube according to claim 1, wherein the polymer has on its surface an exposed reaction group having affinity for a biologically active molecule.

4. The carbon nanotube according to claim 3, wherein the exposed reaction group having affinity for a biologically active molecule is a group selected from vinyl group, amine group, carboxyl group, aldehyde group or hydroxyl group.

5. The carbon nanotube according to claim 1, wherein the polymer is an insulating polymer.

6. The carbon nanotube according to claim 1, wherein the polymer has a nature of binding firmly through crosslinking or polymerization.

7. The carbon nanotube according to claim 1, wherein $R_1$ to $R_5$ in general formula (I) independently represent a methyl group.

* * * * *